(12) United States Patent
Shindo et al.

(10) Patent No.: US 8,308,934 B2
(45) Date of Patent: *Nov. 13, 2012

(54) METHOD OF RECOVERING VALUABLE METALS FROM IZO SCRAP

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 12/863,750

(22) PCT Filed: Dec. 9, 2008

(86) PCT No.: PCT/JP2008/072297
§ 371 (c)(1),
(2), (4) Date: Jul. 20, 2010

(87) PCT Pub. No.: WO2009/110149
PCT Pub. Date: Sep. 11, 2009

(65) Prior Publication Data
US 2010/0288645 A1    Nov. 18, 2010

(30) Foreign Application Priority Data
Mar. 6, 2008 (JP) .................... 2008-056208

(51) Int. Cl.
*C25C 1/22* (2006.01)
*C25C 1/16* (2006.01)
(52) U.S. Cl. ...................... 205/564; 205/602
(58) Field of Classification Search .............. 205/564
See application file for complete search history.

(56) References Cited

U.S. PATENT DOCUMENTS

| | | | |
|---|---|---|---|
| 2,915,444 A | 12/1959 | Meyer | |
| 3,257,299 A | 6/1966 | MekJean | |
| 4,330,377 A | 5/1982 | Franks, Jr. | |
| 4,950,326 A | 8/1990 | Holly | |
| 4,981,564 A | 1/1991 | Kroll et al. | |
| 5,290,412 A | 3/1994 | Saito et al. | |
| 5,417,816 A | 5/1995 | Nakashima et al. | |
| 5,543,031 A | 8/1996 | Okamoto et al. | |
| 5,849,221 A | 12/1998 | Yukinobu et al. | |
| 6,117,209 A | 9/2000 | Adanuvor | |
| 6,896,788 B2 | 5/2005 | Shindo et al. | |
| 7,157,024 B2 | 1/2007 | Isaji et al. | |
| 7,435,325 B2 | 10/2008 | Shindo et al. | |
| 8,003,065 B2 | 8/2011 | Shindo et al. | |
| 8,007,652 B2 | 8/2011 | Shindo et al. | |
| 8,012,335 B2 | 9/2011 | Shindo et al. | |
| 8,012,336 B2 | 9/2011 | Shindo et al. | |
| 8,012,337 B2 | 9/2011 | Shindo et al. | |
| 2009/0004498 A1 | 1/2009 | Shindo et al. | |
| 2010/0072075 A1 | 3/2010 | Shindo et al. | |
| 2010/0084279 A1 | 4/2010 | Shindo et al. | |
| 2010/0084281 A1 | 4/2010 | Shindo et al. | |
| 2010/0101963 A1 | 4/2010 | Shindo et al. | |
| 2010/0101964 A1 | 4/2010 | Shindo et al. | |
| 2010/0193372 A1 | 8/2010 | Shindo et al. | |
| 2010/0282615 A1 | 11/2010 | Shindo et al. | |
| 2010/0288646 A1 | 11/2010 | Shindo et al. | |
| 2010/0294082 A1 | 11/2010 | Shindo et al. | |
| 2010/0316544 A1 | 12/2010 | Shindo et al. | |

FOREIGN PATENT DOCUMENTS

| | | |
|---|---|---|
| JP | 01-219186 A | 9/1989 |
| JP | 05-156381 A | 6/1993 |
| JP | 07-145432 A | 6/1995 |
| JP | 11-343590 A | 12/1999 |
| JP | 2003-247089 A | 9/2003 |
| JP | 2005-314786 A | 11/2005 |
| JP | 2007-131953 A | 5/2007 |
| WO | 2008/053616 A1 | 5/2008 |
| WO | 2008/053617 A1 | 5/2008 |
| WO | 2008/053618 A1 | 5/2008 |
| WO | 2008/053619 A1 | 5/2008 |
| WO | 2008/053620 A1 | 5/2008 |
| WO | 2008/099773 A1 | 8/2008 |
| WO | 2008/099774 A1 | 8/2008 |
| WO | 2008/117649 A1 | 10/2008 |

OTHER PUBLICATIONS

One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.
One page English language Abstract of JP 63-274725 A, Nov. 11, 1988.

*Primary Examiner* — Harry D Wilkins, III
(74) *Attorney, Agent, or Firm* — Howson & Howson LLP

(57) ABSTRACT

Provided is a method of recovering valuable metals from IZO scrap in which valuable metals are recovered as indium and zinc metals or suboxides by performing electrolysis using an insoluble electrode as an anode and an IZO scrap as a cathode. Specifically, this method enables the efficient recovery of indium and zinc from IZO scrap such as an indium-zinc oxide (IZO) sputtering target or IZO mill ends that arise during the manufacture of such a sputtering target.

20 Claims, No Drawings

METHOD OF RECOVERING VALUABLE METALS FROM IZO SCRAP

BACKGROUND OF THE INVENTION

The present invention relates to a method of recovering valuable metals from a spent indium-zinc oxide (IZO) sputtering target or IZO scrap arising during the manufacture of such a target (hereinafter collectively referred to as the "IZO scrap" in this specification). Incidentally, "recovery of valuable metals" as used herein shall include the recovery of metals having valuable metal as its component, as well as solutions, alloys, hydroxides, oxides and suboxides containing such metals.

In recent years, an indium-zinc oxide ($In_2O_3$—ZnO: generally known as IZO) sputtering target is being widely used in numerous electronic components; for instance, for a transparent conductive thin film of an LCD device or a gas sensor. In many cases, however, a thin film is formed by employing the sputtering method as the thin film forming means. IZO is a representative oxide with conductive property.

Although the sputtering method as the thin film forming means is a superior method; for example, if a sputtering target is used to form a transparent conductive thin film, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions; that is, unused portions of the target, and IZO in all of these portions becomes scrap. Moreover, even during the production of a sputtering target, scraps (mill ends) will arise from grinding dust and cutting wastage.

Since indium used as the IZO sputtering target material is expensive, indium is recovered from the foregoing scrap materials, and zinc is also recovered as necessary. As this kind of indium recovery method, conventionally, a method that combines wet refining such as the acid solution process, ion exchange method, and solvent extraction method has been used.

For instance, there is a method of subjecting an IZO scrap to cleansing and pulverizing, dissolving the obtained materials in hydrochloric acid, precipitating and eliminating impurities, such as zinc, tin, lead and copper, as sulfide by passing hydrogen sulfide through the solution, thereafter adding alkali to neutralize the solution, and recovering the resulting indium hydroxide.

Nevertheless, the indium hydroxide obtained by the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the IZO target cannot be stably maintained upon subsequently manufacturing such IZO target.

Conventional technology and its advantages and disadvantages are described below.

As one example of such conventional technology, there is an etching method of a transparent conductive film including the steps of reducing an ITO film deposited on a substrate by an electrochemical reaction in the electrolyte, and dissolving the reduced transparent conductive film in the electrolyte (refer to Patent Document 1). However, the object of this method is to obtain a mask pattern with high precision, and relates to technology that is different from the recovery method. The material is also fundamentally different.

For pretreatment for recovering valuable metals from ITO, there is also technology of separating, in the electrolyte, the impurities contained in an In-based brazing filler material used in the bonding with the backing plate (refer to Patent Document 2). Nevertheless, this method does not relate to direct technology of recovering valuable metals from ITO. This technology does not relate to IZO and the material is fundamentally different.

Moreover, upon recovering indium from an intermediate obtained as a by-product of the zinc refining process or from an ITO scrap, disclosed is technology of separating tin as halogenated stannate, performing reduction treatment with hydrochloric acid or nitric acid solution, subsequently adjusting the pH of this aqueous solution to be between 2 and 5, reducing metallic ions of iron, zinc, copper, thallium and the like in order to make the metallic ions into a substance that will not precipitate easily, and isolating the indium component in the aqueous solution (refer to Patent Document 3). With this technology, however, there are problems in that the refining process is complicated and a superior refining effect cannot be expected.

Further, as a method of recovering high-purity indium, disclosed is technology of dissolving ITO in hydrochloric acid, adding alkali thereto to make the pH within a range of 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated. The material is also fundamentally different.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution thereto after the elimination to obtain indium hydroxide, filtering the obtained indium hydroxide to obtain indium sulfate from the filtered indium hydroxide, and obtaining indium by electrowinning with the indium sulfate (refer to Patent Document 5). Although this is an effective method with a significant refining effect, there is a drawback in that the process is complicated.

Also proposed is a method of recovering indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter recovering indium (refer to Patent Document 6). Although this is also an effective method with a significant refining effect, there is a drawback in that the process is complicated. This technology does not relate to IZO and the material is fundamentally different.

Additionally disclosed is a method of recovering metallic indium including the steps of extracting suboxide-containing cast scrap floating on molten metallic indium, introducing this into an atmosphere furnace, introducing argon gas into the furnace after vacuating the furnace once, heating the furnace to a prescribed temperature and reducing the suboxide-containing cast scrap (refer to Patent Document 7).

Although this is in itself an effective method, there is a drawback in that this is not a fundamental recovery method of IZO scrap. In addition, this technology does not relate to IZO and the material is fundamentally different.

In light of the above, a method that is efficient and with a versatile recovery process is being sought.

[Patent Document 1] Japanese Patent Laid-Open Publication No. S62-290900
[Patent Document 2] Japanese Patent Laid-Open Publication No. H8-41560
[Patent Document 3] Japanese Patent Laid-Open Publication No. H3-82720
[Patent Document 4] Japanese Patent Laid-Open Publication No. 2000-169991
[Patent Document 5] Japanese Patent Laid-Open Publication No. 2002-69684
[Patent Document 6] Japanese Patent Laid-Open Publication No. 2002-69544
[Patent Document 7] Japanese Patent Laid-Open Publication No. 2002-241865

SUMMARY OF THE INVENTION

In order to overcome the foregoing problems, the present invention provides a method of efficiently recovering valuable metals from IZO scrap or scrap such as mill ends arising during the manufacture of a sputtering target.

The present invention provides a method of recovering valuable metals from IZO scrap by performing electrolysis using an insoluble electrode as the anode and the IZO scrap as the cathode, and reducing the scrap as the cathode to metal or suboxide. "Recovery of valuable metals" as used herein shall include the recovery of metals having valuable metal as its component, as well as solutions, alloys, hydroxides, oxides and suboxides containing such metals.

Generally speaking, since scrap of IZO and the like is an oxide-system ceramic, it would not normally be possible to envisage recovering valuable metals by the electrolytic method. Nevertheless, IZO itself possesses conductive property even though it is an oxide-system ceramic. The present invention focused attention on this point and attempted to recover valuable metals (for instance, in the case of IZO, indium or zinc and the compound thereof) by electrolysis, and succeeded.

This is a significant feature of the present invention. Conventionally, it was common practice to use metal scraps, which are the raw material to be subject to recovery, as the anode, and there is no technology that offered such reversal idea as in the present invention. Nor is there any document that suggests this kind of method.

Thus, the method of recovering valuable metals from scrap containing conductive oxide according to the present invention is a basic invention.

It is well known that IZO itself possesses conductive property. This is considered to be due to the oxygen defect in the oxide as the sintered compact. The present invention utilizes the conductive property of the oxide itself. Nevertheless, it should be understood that the knowledge and judgment that the conductive property inherent in oxide itself enables a recovery of valuable metals by electrolysis could only be realized through the implementation of numerous experiments.

When performing a conventional method of recycling IZO scrap; a recycled IZO is manufactured by pulverizing the IZO scrap, dissolving it in strong acid, and then going through a process that a plurality of process steps, such as reduction, substitution, sulfurization, precipitation, neutralization, filtration, solvent extraction, ion exchange and casting, are arbitrarily combined.

The problems in the foregoing process steps are that impurities are incorporated during the pulverization process of IZO scrap, and the overall process becomes more complicated since it is necessary to eliminate the impurities incorporated during the pulverization process at the subsequent process steps.

Thus, it should be easy to understand that it has an extremely significant benefit that valuable metals can be recovered directly from IZO scrap by electrolysis.

The present invention provides a method of recovering valuable metals from IZO scrap in which the IZO scrap is reduced to indium and zinc metal or suboxide with hydrogen generated at a cathode during electrolysis, and a method of recovering valuable metals from IZO scrap in which the metal or suboxide generated at a cathode is dissolved with acid and valuable metals are recovered as a solution.

The present invention additionally provides a method of recovering valuable metals from IZO scrap in which the metal or suboxide generated at the cathode is dissolved with acid or alkali, zinc is eliminated from the solution, and electrowinning is performed to the solution after the elimination of zinc to recover indium metal; a method of recovering valuable metals from IZO scrap in which valuable metals are recovered as hydroxide from the recovered metal solution; and a method of recovering valuable metals from IZO scrap in which valuable metals are recovered as metal or alloy by subjecting a solution of the recovered metals to electrolysis.

The present invention further provides a method of recovering valuable metals from IZO scrap in which indium and/or zinc hydroxide or suboxide or a mixture thereof is roasted, and valuable metals are recovered as oxide or a compound oxide or an oxide mixture thereof.

Upon recovering valuable metals from IZO scrap, electrolysis is performed by adjusting the pH of electrolyte to an acidic region; and it is possible to reduce the IZO scrap as the cathode to metal. With the metal solution recovered as above, a part of its constituent metal (zinc) may be eliminated with the neutralization method, solvent extraction method or the like, and valuable metals such as indium may be recovered from such solution by electrowinning.

With the solution recovered as described above, pH of this solution may be adjusted to 3 to 11, and then hydroxide or a mixture of two types of hydroxides may be recovered. By roasting the indium or zinc hydroxide or a mixture of the indium and zinc hydroxides recovered as described above, it is possible to recover valuable metals as the oxides or a mixture of the oxides thereof.

As described above, the method according to the present invention enables to recover valuable metals, which retain the purity of IZO scrap itself if such IZO scrap subjected to electrolysis contains high-purity materials, from IZO scrap as metals of indium and/or zinc having high-purity valuable metals as its component, a solution containing such metals, high-purity alloys, high-purity indium and/or zinc hydroxide or a mixture of the hydroxides thereof, or high-purity indium and/or zinc oxide or suboxide or a mixture thereof.

It goes without saying that this is a significant advantage of the present invention. The present invention yields superior effects of no longer requiring such complicated processes and process of eliminating impurities incorporated during production as were required in the past, and being able to increase the production efficiency and recover high-purity valuable metals.

The electrolytic condition such as the current density is not uniformly decided since the subject is scrap such as mill ends, and electrolysis is performed by arbitrarily selecting the current density according to the amount of mill ends and the nature of material. The liquid temperature of the electrolyte solution is generally set to a range of 0 to 100° C., but room temperature (15 to 30° C.) will suffice.

Since sputtering target of indium-zinc oxide (IZO) and the like or IZO scrap arising during the manufacture of such a target is used and electrolysis is simply performed by using an insoluble electrode as an anode and such IZO scrap as a cathode, the present invention enables simple and efficient recovery of valuable metals as indium and/or zinc metal, a solution containing such metals, alloy of indium and zinc, indium and/or zinc hydroxide or a mixture thereof, or indium and/or zinc oxide or suboxide or a mixture thereof.

Moreover, the method of recovering valuable metals from IZO scrap according to the present invention enables to recover the foregoing materials, which retain the purity of IZO scrap itself if such IZO scrap subjected to electrolysis is a scrap formed from high-purity material. This is a significant advantage of the present invention. The present invention yields superior effects of no longer requiring such complicated processes and process of eliminating impurities incorporated during production as were required in the past, and being able to increase the production efficiency and recover high-purity valuable metals.

DETAILED DESCRIPTION OF THE INVENTION

The present invention is capable of efficiently and easily recovering valuable metals from scrap containing valuable metals, such as a spent IZO target, by electrolysis as indium and/or zinc metal, a solution containing such metal, indium and zinc alloy, indium and/or zinc hydroxide, or a mixture of hydroxides. Moreover, by roasting the obtained hydroxide or a mixture of hydroxides, it is possible to efficiently recover valuable metals as indium and/or zinc oxide, or a mixture of oxides.

The roasting temperature is set to 100 to 1000° C., preferably 100 to 500° C. Moisture will remain if the roasting temperature is less than 100° C., and sintering will occur if the roasting temperature is higher than 1000° C. Thus, it is desirable to set the roasting temperature within the foregoing range. Nevertheless, depending on the material, it goes without saying that the roasting temperature may be set outside of the foregoing range. The foregoing range is proposed as a general indicator of the roasting condition.

As the electrolyte, a solution of sodium sulfate, sodium chloride, sodium nitrate, ammonium sulfate, ammonium chloride, ammonium nitrate, potassium chloride, potassium nitrate, potassium sulfate and the like may be arbitrarily selected and used as described above. Incidentally, since ammonia gas will be generated and there will a nitrogen load in the discharge treatment if the cation is of ammonia series; attention is required to the processing. Moreover, since chlorine gas will be generated if the anion is of chlorine series, and since NOx gas will be generated and there will a nitrogen load of the discharged water if the anion is of nitric acid series; attention is required to the processing.

Since sulfuric acid series hardly entail the foregoing problems, it could be said that a solution of sulfuric acid series would be a suitable material. Nevertheless, there is no reason that other electrolytes cannot be used so as long as the foregoing problems can be overcome.

In addition, it is also possible to use a publicly-known additive agent in order to improve the current efficiency. As described above, it should be easily understood that the recycle efficiency will improve if two or more types of recycled oxides can be simultaneously recovered and they are close to a recycled product.

A special electrolytic apparatus is not required. For instance, it would suffice to perform electrolysis using an IZO scrap to be subject to electrolysis as the cathode and using an insoluble electrode of carbon or noble metal or the like as the anode. It is thereby possible to avoid the increase or inclusion of impurities more than initially contained in the IZO scrap.

It is also desirable to perform electrolysis by adjusting the pH of the electrolyte to be 7 or less. This is a preferable condition for reduction, and it is based on the intention of generating hydrogen gas from the cathode and using such hydrogen gas to reduce oxide to metal. Incidentally, the foregoing preferred pH is merely an example, and it should be easily understood that such pH may be changed according to the difference in types of scrap material.

It is desirable to adjust the electrolytic condition as needed according to the type of raw material. The only factor to be adjusted in this case is the production efficiency. Generally speaking, better productivity can be attained through electrolysis with a large current and high voltage. Nevertheless, there is no need to limit the conditions to the foregoing conditions, and such conditions may be arbitrarily selected.

Further, although there is no particular limit on the electrolysis temperature, it is desirable to adjust the temperature to 0 to 100° C. to perform electrolysis. Electrolysis can be sufficiently performed at room temperature. Scraps such as mill ends may be placed in a cathode box (basket) for the electrolysis. If a scrap itself is of a certain size (enough size that can be used as an electrode), it can be used as an electrode plate as is.

When electrical current is applied to the anode formed from the insoluble electrode or the cathode formed from IZO scrap and electrolysis is commenced, oxygen gas is generated at the anode. However, the generation of oxygen gas will not cause any particular problem.

Meanwhile, hydrogen gas is generated at the cathode of the IZO scrap simultaneously with the start of energization, and the IZO scrap is subject to hydrogen reduction and becomes metal ($IZO+H_2 \rightarrow In$—Zn metal). The generation of hydrogen is caused by the electrolysis of water ($H_2O \rightarrow \frac{1}{2}H_2+OH^-$).

Nevertheless, if the energization time becomes long, metal (In, Zn) having a certain thickness is accumulated on the cathode surface of the IZO scrap, sponge-like metal suboxide will merely be formed below the metal surface layer, and the reduction will not progress any further. Therefore, it would be desirable to discontinue the electrolysis, dissolve the created metal and suboxide of such metal with acid, and expose the new IZO surface. Consequently, a newly created face will appear and the reduction will continue to progress.

From the recovered metal solution, zinc is eliminated with the neutralization method, replacement method, hydrolysis method or the like, and electrowinning is further performed to the solution after the zinc is eliminated in order to recover indium. With the neutralization method, the solution is neutralized with an alkali solution such as sodium hydroxide, potassium hydroxide and ammonia, indium hydroxide is precipitated at pH of 3 to 5, and zinc is left in the solution and separated.

Moreover, at pH 5 or higher, it is also possible to recover a mixture of indium and zinc hydroxides. The recovered hydroxide may further be roasted at 100 to 1000° C. in order to recover valuable metals as oxide.

The oxide obtained thereby may be used as is as the raw material of the product. Moreover, as needed, oxide may also be supplemented or added to change the component amount, or other elements or compounds may be added, and sintering may be performed to easily obtain a recycled target. The present invention covers all of the foregoing aspects.

Meanwhile, by performing electrolysis to the recovered indium and zinc metal solution, the valuable metals can also be recovered as an alloy.

In all of the foregoing cases, the precondition is that an insoluble electrode is used as the anode, IZO scrap as the cathode is reduced to metal, and such metal is further dissolved with acid to obtain a metal solution.

From this metal solution, the valuable metals can be recovered in other required forms such as indium and zinc metal, their alloys, indium and/or zinc metal solution, indium and/or zinc hydroxide, or indium and/or zinc oxide.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

290 g of plate-shaped mill ends (scrap) of IZO (indium oxide-zinc oxide) was used as the raw material. The components in this raw material were 10.7 wt % of zinc oxide (ZnO) and the remaining indium oxide ($In_2O_3$).

The raw material was used as the cathode, and carbon as an insoluble electrode was used as the anode. Electrolysis was performed by using 1 L of electrolyte containing 70 g/L of sodium sulfate, and by setting the pH at 2.0 and the electrolysis temperature at 30° C. The voltage was 10V (fixed voltage).

Consequently, In and Zn metals were formed on the surface of the IZO mill ends, and the suboxide in sponge form was formed internally.

Example 2

The In and Zn metals and suboxide obtained with electrolysis was further subject to acid leaching with sulfuric acid to obtain a solution of indium and zinc, this solution was adjusted to pH 4.0, and indium was obtained as indium hydroxide. The indium hydroxide was further dissolved with sulfuric acid and subject to electrowinning under the conditions of electrolysis temperature of 30° C. and current density of 2 A/dm$^2$.

As a result of the foregoing process, it was possible to recover approximately 20 g of valuable metal (In) from an IZO scrap.

Example 3

The IZO mill ends of Example 1 were used as the cathode, and Pt was used as the anode. Electrolysis was performed by using 100 g/L of sodium nitrate solution, and by setting the pH at 1.0 and the electrolysis temperature at 30° C. The voltage was 10V (fixed voltage).

Consequently, as with Example 1, In and Zn metals were formed on the surface of the IZO mill ends, and the suboxide in sponge form was formed internally. It was possible to obtain indium, zinc and their suboxides. The total amount of indium and zinc obtained by the electrolysis was roughly 24 g based on metal conversion.

Example 4

Electrolysis was performed by setting the voltage at a fixed voltage of 5V, and with the other conditions being the same as Example 1. The amount of integrated current was also set to be the same as Example 1. Consequently, as with Example 1, In and Zn metals were formed on the surface of the IZO mill ends, and the suboxide in sponge form was formed internally. It was possible to obtain indium, zinc and their suboxides, and the total amount of indium and zinc obtained by the electrolysis was roughly 15 g based on metal conversion.

Example 5

Electrolysis was performed by setting the voltage at a fixed voltage of 2V, and with the other conditions being the same as Example 1. The amount of integrated current was also set to be the same as Example 1. Consequently, as with Example 1, In and Zn metals were formed on the surface of the IZO mill ends, and the suboxide in sponge form was formed internally. It was possible to obtain indium, zinc and their suboxides, and the total amount of indium and zinc obtained by the electrolysis was roughly 10 g based on metal conversion.

Example 6

Electrolysis was performed by setting the voltage at a fixed voltage of 20V, and with the other conditions being the same as Example 1. The amount of integrated current was also set to be the same as Example 1. Consequently, as with Example 1, In and Zn metals were formed on the surface of the IZO mill ends, and the suboxide in sponge form was formed internally. It was possible to obtain indium, zinc and their suboxides, and the total amount of indium and zinc obtained by the electrolysis was roughly 22 g based on metal conversion.

Example 7

10 kg of plate-shaped mill ends (scrap) was placed in a cathode box and used as the raw material. The components in this raw material were 10.7 wt % of zinc oxide (ZnO), and the remaining indium oxide ($In_2O_3$).

The raw material was used as the cathode, and Pt was used as the anode. Electrolysis was performed by using 1 L of electrolyte containing 100 g/L of sodium chloride, and by setting the pH at 3.0 and the electrolysis temperature at 30° C. The voltage was 10V (fixed voltage). Consequently, it was possible to obtain indium, zinc and their suboxides, and the total amount of indium and zinc obtained by the electrolysis was roughly 2.5 kg based on metal conversion. The purity of this mixture was equivalent to Example 1.

Comparative Example 1

2 kg of IZO (indium oxide-zinc oxide) scrap equivalent to Example 1 was used as the raw material. The components in this raw material were 10.7 wt % of zinc oxide (ZnO), and the remaining indium oxide ($In_2O_3$). This raw material was used as the cathode, and insoluble carbon was used as the anode. Electrolysis was performed under the electrolytic condition of pH 12.

Consequently, there was no change in the cathode, and it was not possible to recover indium, zinc and their suboxides.

Although, in each of the foregoing Examples, IZO (indium oxide-zinc oxide) mill ends or scraps of which components were 10.7 wt % of zinc oxide (ZnO) and the remaining indium oxide ($In_2O_3$) were used; it goes without saying that the electrolytic conditions such as the current density and pH can be arbitrarily changed according to the component amount of $In_2O_3$ and ZnO, and the raw material is not to be considered particularly limited to the foregoing component amount. In particular, with IZO, the content of zinc oxide (ZnO) varies from 5 wt % to 30 wt %, and the present invention can also be sufficiently applied in the foregoing cases.

In addition, although there are cases where small amounts of accessory components are added to the IZO, so as long as IZO is the basic constituent, it goes without saying that the present invention can also be applied to this case.

With the present invention, indium-zinc metal is formed on the cathode by performing electrolysis using an insoluble electrode as the anode and an IZO scrap as the cathode, this is further dissolved with sulfuric acid, and it is thereby possible to recover valuable metals as indium or zinc metal having the valuable metal to be used as its component, a solution containing such metals, high-purity indium-zinc alloy, a mixture of high-purity indium hydroxide and zinc hydroxide, or a mixture of high-purity indium oxide and zinc oxide. Thus, valuable metals can be efficiently recovered from the IZO scrap.

Since IZO scrap, such as an indium-zinc oxide (IZO) sputtering target and mill ends arising during the manufacture of such a target, is used and electrolysis is simply performed by using an insoluble electrode as an anode and such IZO scrap as a cathode; the present invention enables simple and efficient recovery of valuable metals as indium and/or zinc metal having the valuable metal as its component, a solution containing such metals, alloy of indium and zinc, indium and/or zinc hydroxide, indium and/or zinc oxide, indium and/or zinc suboxide, or a mixture thereof.

Moreover, with the method of recovering valuable metals from IZO scrap according to the present invention, it is possible that the obtained material retains the purity of the IZO scrap to be subject to electrolysis without change. This is a significant advantage of the present invention. The present invention yields superior effects of no longer requiring such complicated processes and process of eliminating impurities incorporated during production as were required in the past, and being able to increase the production efficiency and recover high-purity valuable metals. Thus, the present invention is extremely useful as a method of recovering valuable metals from IZO scrap.

The invention claimed is:

1. A method of recovering valuable metals from IZO scrap, wherein valuable metals are recovered as indium and zinc metal or suboxide by performing electrolysis using an insoluble electrode as an anode and an WO scrap as a cathode.

2. The method of recovering valuable metals from IZO scrap according to claim 1, wherein the IZO scrap is reduced to metal or suboxide with hydrogen generated at a cathode during the electrolysis.

3. The method of recovering valuable metals from IZO scrap according to claim 2, wherein the metal or suboxide generated at the cathode is dissolved with acid and valuable metals are recovered as a solution.

4. The method of recovering valuable metals from IZO scrap according to claim 3, wherein the metal or suboxide generated at the cathode is dissolved with acid or alkali, zinc is eliminated from the solution thereof, and electrowinning is performed to the solution after the elimination to recover indium.

5. The method of recovering valuable metals from IZO scrap according to claim 3, wherein valuable metals are recovered as hydroxide from the solution of the recovered metal or suboxide.

6. The method of recovering valuable metals from IZO scrap according to claim 3, wherein valuable metals are recovered as indium-zinc alloy by subjecting the solution of the recovered metal to electrolysis.

7. The method of recovering valuable metals from IZO scrap according to claim 5, wherein indium or zinc hydroxide or suboxide is roasted, and valuable metals are recovered as oxides thereof.

8. The method of recovering valuable metals from IZO scrap according to claim 2, wherein the metal or suboxide generated at the cathode is dissolved with acid or alkali, zinc is eliminated from a solution thereof, and electrowinning is performed to the solution after zinc is eliminated to recover indium.

9. The method of recovering valuable metals from IZO scrap according to claim 2, wherein valuable metals are recovered as hydroxide from a solution of the recovered metal or suboxide.

10. The method of recovering valuable metals from IZO scrap according to claim 9, wherein indium or zinc hydroxide or suboxide is roasted, and valuable metals are recovered as oxides thereof.

11. The method of recovering valuable metals from IZO scrap according to claim 2, wherein valuable metals are recovered as indium-zinc alloy by subjecting a solution of the recovered metal to electrolysis.

12. The method of recovering valuable metals from IZO scrap according to claim 1, wherein the metal or suboxide generated at the cathode is dissolved with acid and valuable metals are recovered as a solution.

13. The method of recovering valuable metals from IZO scrap according to claim 12, wherein the metal or suboxide generated at the cathode is dissolved with acid or alkali, zinc is eliminated from the solution thereof, and electrowinning is performed to the solution after zinc is eliminated to recover indium.

14. The method of recovering valuable metals from IZO scrap according to claim 12, wherein valuable metals are recovered as hydroxide from the solution of the recovered metal or suboxide.

15. The method of recovering valuable metals from IZO scrap according to claim 14, wherein indium or zinc hydroxide or suboxide is roasted, and valuable metals are recovered as oxides thereof.

16. The method of recovering valuable metals from IZO scrap according to claim 12, wherein valuable metals are recovered as indium-zinc alloy by subjecting the solution of the recovered metal to electrolysis.

17. The method of recovering valuable metals from IZO scrap according to claim 1, wherein the metal or suboxide generated at the cathode is dissolved with acid or alkali, zinc is eliminated from a solution thereof, and electrowinning is performed to the solution after zinc is eliminated to recover indium.

18. The method of recovering valuable metals from IZO scrap according to claim 1, wherein valuable metals are recovered as hydroxide from a solution of the recovered metal or suboxide.

19. The method of recovering valuable metals from IZO scrap according to claim 18, wherein indium or zinc hydroxide or suboxide is roasted, and valuable metals are recovered as oxides thereof.

20. The method of recovering valuable metals from IZO scrap according to claim 1, wherein valuable metals are recovered as indium-zinc alloy by subjecting a solution of the recovered metal to electrolysis.

* * * * *

UNITED STATES PATENT AND TRADEMARK OFFICE
CERTIFICATE OF CORRECTION

PATENT NO. : 8,308,934 B2
APPLICATION NO. : 12/863750
DATED : November 13, 2012
INVENTOR(S) : Yuichiro Shindo et al.

Page 1 of 1

It is certified that error appears in the above-identified patent and that said Letters Patent is hereby corrected as shown below:

Column 9, line 45 "WO" should read "IZO".

Signed and Sealed this
Fifth Day of February, 2013

Teresa Stanek Rea
*Acting Director of the United States Patent and Trademark Office*